US012622424B1

(12) United States Patent
McGinnis

(10) Patent No.: US 12,622,424 B1
(45) Date of Patent: May 12, 2026

(54) LINEAR MEMBER CARRIER AND STORAGE DEVICE

(71) Applicant: Walker Eugene McGinnis, Mt Pleasant, SC (US)

(72) Inventor: Walker Eugene McGinnis, Mt Pleasant, SC (US)

( * ) Notice: Subject to any disclaimer, the term of this patent is extended or adjusted under 35 U.S.C. 154(b) by 0 days.

(21) Appl. No.: 18/203,155

(22) Filed: May 30, 2023

(51) Int. Cl.
*A01K 97/08* (2006.01)

(52) U.S. Cl.
CPC .................................... *A01K 97/08* (2013.01)

(58) Field of Classification Search
CPC ........ A01K 97/08; A01K 97/10; B60R 9/055; B60R 9/065; B60R 9/08; B60R 9/12; B65D 81/05; B65D 81/051
USPC ................. 43/21.2, 26; 224/249; 206/315.11
See application file for complete search history.

(56) References Cited

U.S. PATENT DOCUMENTS

| | | | |
|---|---|---|---|
| 2,473,977 A | 6/1949 | Tutton | |
| 2,595,230 A | 5/1952 | Daviau | |
| 4,523,704 A | * 6/1985 | Washington | ............ B60R 9/055 |
| | | | 224/329 |
| 4,858,366 A | * 8/1989 | Rushton | ................. A01K 97/08 |
| | | | 43/26 |
| 5,071,048 A | * 12/1991 | Price | ...................... A01K 97/08 |
| | | | 224/604 |
| 5,425,194 A | * 6/1995 | Miller | .................... A01K 97/08 |
| | | | 220/4.23 |
| 5,678,348 A | 10/1997 | Zielinski et al. | |
| D426,282 S | * 6/2000 | Harmon | ........................ D22/147 |
| 6,910,592 B1 | 6/2005 | Lindenmeyer | |
| 10,369,438 B2 | 8/2019 | Orme et al. | |
| 11,606,945 B2 | 3/2023 | Garcia | |
| 2005/0255765 A1 | 11/2005 | Frese | |
| 2006/0207161 A1 | 9/2006 | Lynn | |
| 2023/0062755 A1 | 3/2023 | Riley | |
| 2023/0240277 A1 | * 8/2023 | Smith | .................... A01K 97/08 |
| | | | 43/21.2 |

* cited by examiner

*Primary Examiner* — Peter M Poon
*Assistant Examiner* — Danielle A Clerkley
(74) *Attorney, Agent, or Firm* — The Law Office of Austin Bonderer, PC; Austin Bonderer

(57) ABSTRACT

A linear member holder has opening sections and securing sections. Linear members can be inserted through the opening sections and secured by the securing sections. The linear member holder is able to hold fishing poles, keep them separated and free from tangling, and maintain a distance between the reels.

17 Claims, 3 Drawing Sheets

LINEAR MEMBER CARRIER AND STORAGE DEVICE

FIELD

The subject matter herein generally relates to a device and method for storing and transporting multiple linear members. While the description contained herein generally relates to the linear members being fishing poles, the invention is not to be limited thereto.

BRIEF DESCRIPTION OF THE DRAWINGS

Implementations of the present technology will now be described, by way of example only, with reference to the attached figures, wherein.

DETAILED DESCRIPTION

Figure 1:
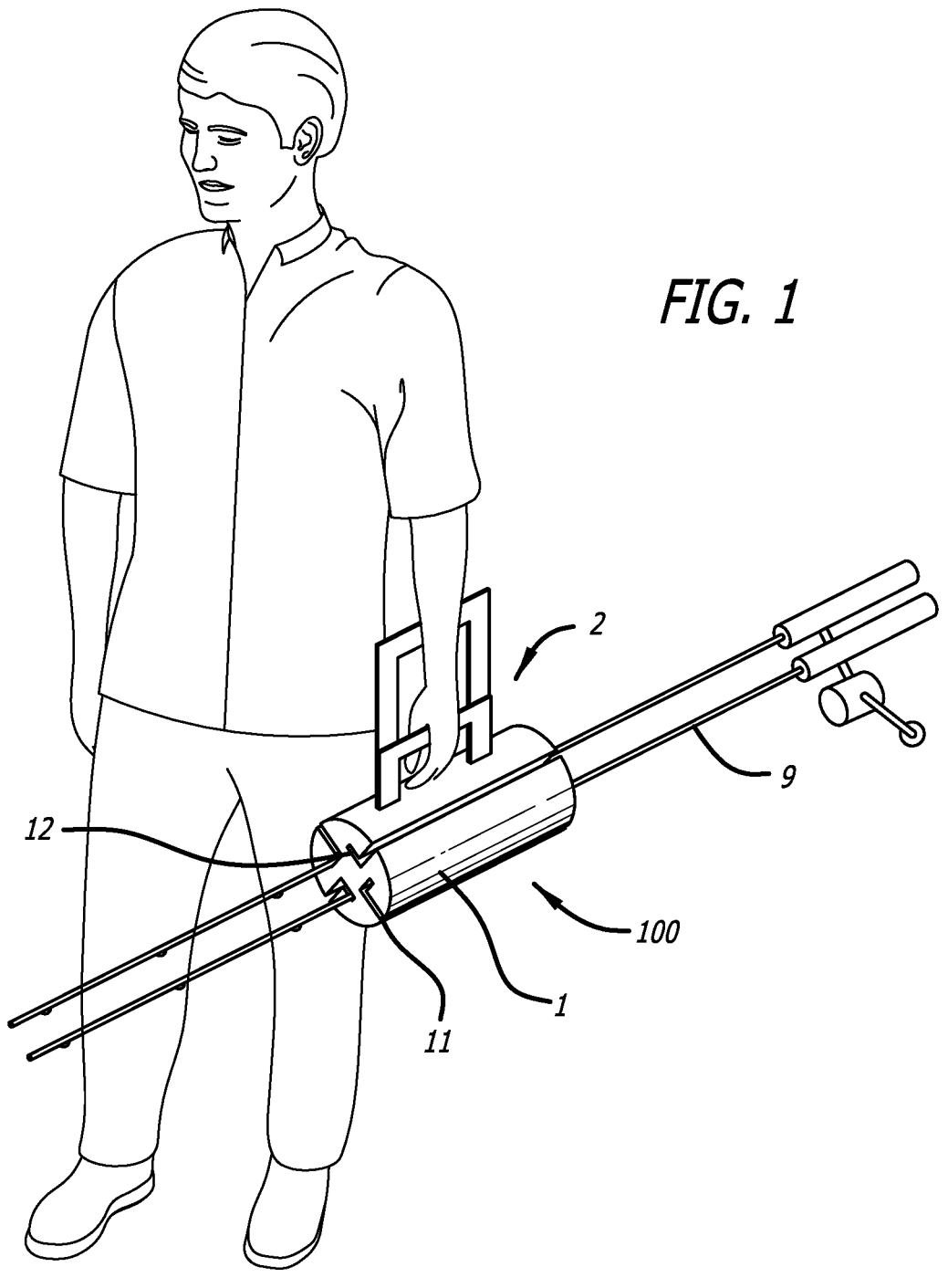
FIG. 1 shows an embodiment of the linear member holder used by a user.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein. It should be noted that references to "an" or "one" embodiment in this disclosure are not necessarily to the same embodiment, and such references mean at least one.

Several definitions that apply throughout this disclosure will now be presented.

The term "coupled" is defined as connected, whether integral with, directly attached, or indirectly attached through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" in relation to quantitative measurements (unless otherwise stated) includes, but is not limited to, the disclosed measure and measurements about the disclosed measure in terms of its disclosed degree. For example, "about 90" would at least include 80-100, whereas "about 90.0" would at least include 89.0-91.0. The term "comprising" means "including, but not necessarily limited to"; it specifically indicates open-ended inclusion or membership in a so-described combination, group, series and the like.

The present disclosure is described in relation to a carrier for multiple linear members, in particular fishing poles. As mentioned above, the invention is not necessarily limited to the storing and carrying of fishing poles.

FIG. 1 illustrates an embodiment of the linear member holder 100 in use. In some embodiments, the linear member holder 100 comprises a body section 1. body section 1 defines two or more opening sections 11 that extend into the body section 1 to a securing section 12. In some embodiments, the linear member holder 100 comprises a holder 2. As seen, linear members 9 are secured in securing sections 12. In some embodiments, the linear member 9 comprises a fishing pole. In some embodiments, the opening section 11 and the securing section 12 define a substantially L-shape. In some embodiments, multiple sets of opening sections 11 and securing sections 12 are defined by the body section 1. In some embodiments, the angle 13 between the opening section 11 and the securing section 12 is 90 degrees, about 90 degrees, 45 degrees, or about 45 degrees, or an angle greater than 0. In some embodiments, the corner between the opening section 11 and the securing section 12 are squared or rounded. In some embodiments, the securing section 12 is narrower than the opening section 11 to apply more engagement with the linear member 9 than the opening section 11. In some embodiments, the securing section 12 has the same width as the corresponding opening section 11. In some embodiments, the opening section 11 has a consistent width, a varying width, or a narrowing width along its length. In some embodiments, the securing section 12 has a consistent width, a varying width, or a narrowing width along its length. In embodiments where the securing section 12 has a narrowing width along its length, more engagement between linear member 9 and the securing section is created as the linear member 9 is inserted further into the securing section 12.

Ins some embodiments, the linear member holder 100 can hold multiple fishing poles. There is often an issue when transporting more than one fishing pole. Often, the hooks and lines of one pole will entangle with the hooks and lines of another. Further, the reels are expensive and will hit each other. The linear member holder 100, when the poles are placed in the securing section 12, the lines, hooks, and reels are kept separated.

In some embodiments, the body section 1 comprises of one or more parts. As seen in the figures, in some embodiments, the body section 1 can be defined by a single unitary structure. In some embodiments, the body section 1 comprises two or more sections that are coupled together. In some embodiments, where the holder 2 is coupled to body section 1 via the holder area 19. In some embodiments, the body section 1 comprises a securing area 18. In some embodiments, the material and/or the properties of the material differ for the holder area 19 and the securing area 18. In some embodiments, the holder area 19 is a firmer or softer, more or less elastic, or a combination thereof, as compared to the securing area 18.

Figure 2:
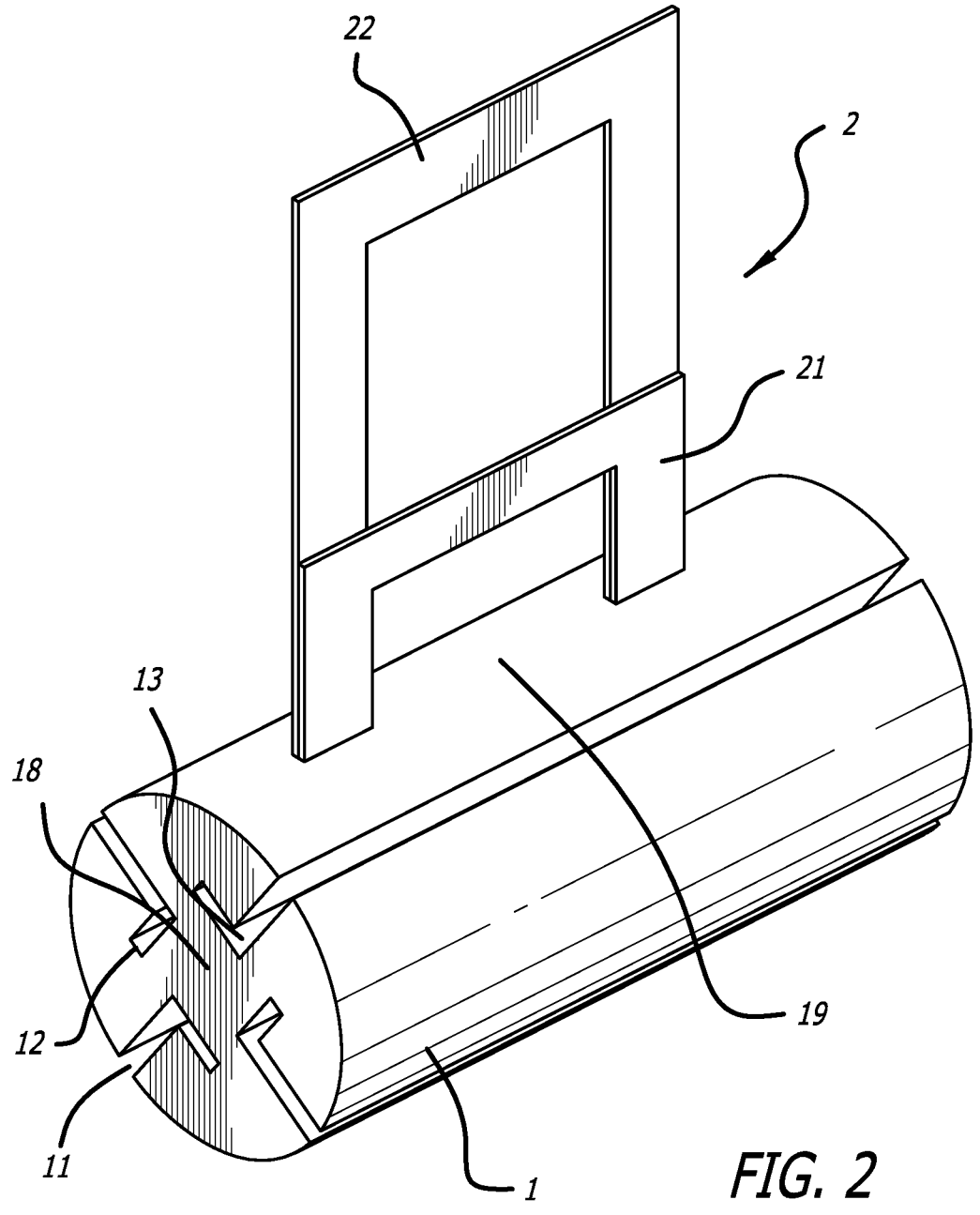
FIG. 2 shows an embodiment of the linear member holder.

FIG. 2 illustrates an embodiment of the linear member holder 100. In some embodiments, the holder 2 comprises a handle 21, a strap 22, or a combination thereof. In some embodiments, the linear member holder 100 further comprises an engagement member (not shown) coupled to the body section 1. In some embodiments, the engagement member comprises a hook and/or an apparatus that can engage a hook, e.g. a ring buckle, so that it can be secured by a hook. In some embodiments, the engagement member allows the linear member holder 100 to be secured vertically to a surface by a hook, nail or other structure. In some embodiments, the engagement member is located partially inside the body section 1 or outside the body section 1. In some embodiments, the engagement member can be coupled to the holder area 19.

In some embodiments, the holder 2 is positioned substantially between two opening sections 11.

Figure 3:
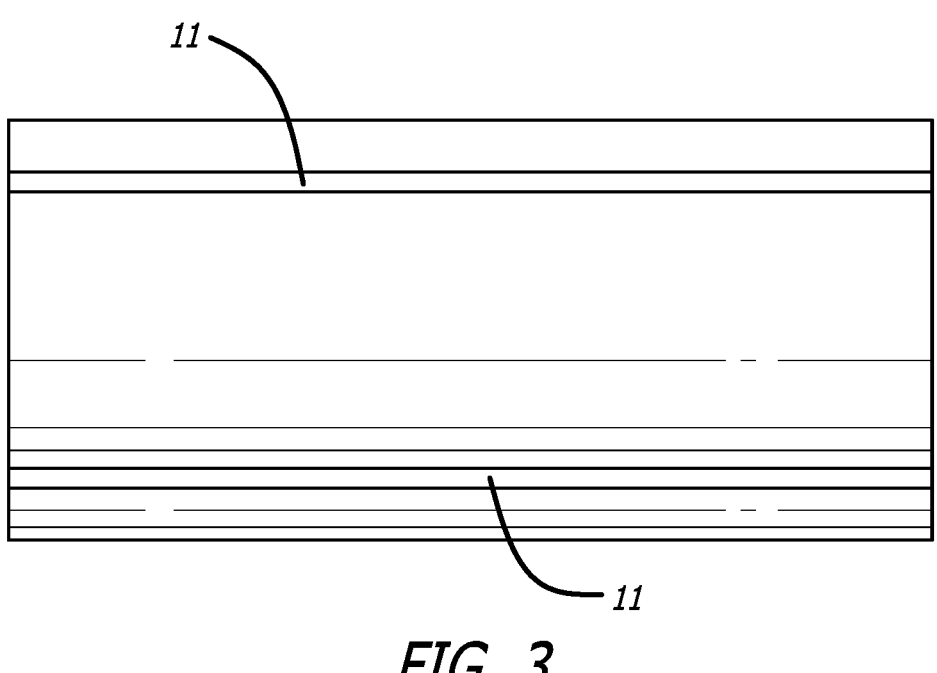
FIG. 3 shows a side view of an embodiment of the linear member holder.

FIG. 3 illustrates an embodiment of the body section 1. As can be seen, in some embodiments, the linear member holder 100 is substantially round. It is to be understood, in some embodiments, the body section 1 defines a regular or irregular polygon. In some embodiments, the body section 1 defines a square, hexagon, an octagon, or a pentagon.

Figure 4:
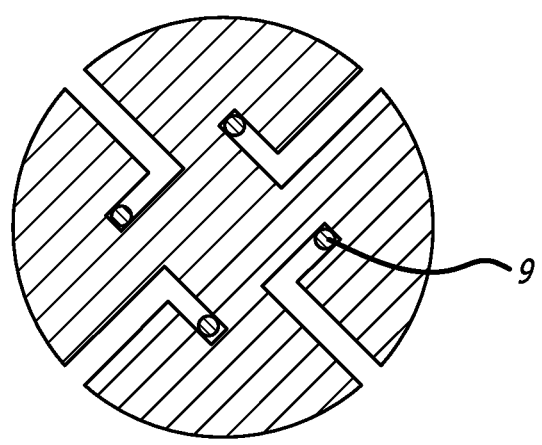
FIG. 4 shows a cross-section of an embodiment of the linear member holder securing four linear members.

FIG. 4 illustrates an embodiment of the linear member holder 100 having linear members 9 secured therein. In some embodiments, the securing area 18 comprises a foam. In some embodiments, the securing section 12 is smaller than the linear member 9. In some embodiments, the securing section 12 is elastic. In some embodiments, the securing section 12 comprises an elastic foam material. As can be seen, when two or more linear members 9 are secured in the linear member holder 100 the securing area 18 will keep them separated from each other. In some embodiments, the length of the linear member holder 100 will prevent linear members 9 from pivoting. In some embodiments, when the linear members 9 are fishing poles, the distance between the two or more securing sections 12 will prevent the rods from bumping each other during transport or storage, and the linear member holder 100 will also prevent the reels from bumping each other.

In use, a user will place a linear member 9 into the opening section 11, slide the linear member 9 along the inside of the opening section 11 into the securing area 18, and then move the linear member 9 inside the securing section 12. To remove the linear member 9, the user will move the linear member 9 out of the securing section 12, out of the securing area 18, and through the opening section 11.

In some embodiments comprising a handle 21, the user can hold the handle 21 when transporting the linear member holder 100. In some embodiments with the strap 22, the user can secure the strap 22 over their shoulder. In some embodiments, the user can use the handle 21 and/or the strap 22 to secure to a structure for storage of the linear members 9.

In some embodiments, the linear member holder 100 can float. In some embodiments, the linear member holder 100 comprises Ethylene-Vinyl Acetate (EVA) foam. In some embodiments, the linear member holder 100 is buoyant, in fresh or salt water, with the full amount of linear members 9 located therein.

In some embodiments, there are 2, 3, 4, 5, 6, or more opening sections 11 and securing sections 12.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

It should also be noted that elements of embodiments may be described in reference to the description of a particular embodiment; however it is disclosed that elements of disclosed embodiments can be switched with corresponding elements of embodiments with the same name and/or number of other disclosed embodiments.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A linear member holder comprising:
a body comprising: a substantially circular cross-section;
at least two opening slots running along a length of the body and extending from an exterior of the body toward a respective securing end; and
a corner angle is formed at an intersection of each of the opening slots and the respective securing ends, the corner angle is greater than 0 degrees, each opening slot is configured to accept a linear member and each securing end is configured to secure said linear member;
wherein at least a portion of each securing end is narrower than at least a portion of the opening slot and at least a portion of the securing end is smaller than the linear member such that a compression force is applied on the linear member, when the linear member is inserted.

2. The linear member holder of claim 1, wherein the body comprises a buoyant material.

3. The linear member holder of claim 1, wherein each opening slot has a varying width.

4. The linear member holder of claim 1, wherein each opening slot has a narrowing width.

5. The linear member holder of claim 1, wherein each securing end has a narrowing width.

6. The linear member holder of claim 1, wherein the angle is about 90 degrees.

7. The linear member holder of claim 1, further comprising a ring buckle.

8. The linear member holder of claim 1, further comprising a holding means coupled to the exterior of the body, wherein the holding means comprises a handle, a strap, a hook, a ring buckle, or a combination thereof.

9. The linear member holder of claim 1, wherein the body comprises a holder area on the exterior of the body, wherein the holding means is coupled to the exterior of the body via the holder area.

10. The linear member holder of claim 1, further comprising a linear member located in each securing end.

11. The linear member holder of claim 10, wherein the linear member holder is buoyant.

12. The linear member holder of claim 10, wherein at least one of the linear members is of a different thickness than other linear members.

13. The linear member holder of claim 10, wherein each linear member comprises a fishing pole.

14. The linear member holder of claim 13, wherein each fishing pole comprises a reel, and each reel is separated from each other.

15. The linear member holder of claim 1, wherein each opening slot extends into the body the same distance.

16. A linear member holder comprising:
a body comprising a substantially circular cross-section;
at least two opening slots running along a length of the body, and each opening slot communicates with a securing end that also runs along the length of the body; a corner angle is formed at an intersection of each of the opening slots and the respective securing ends, the corner angle is greater than 0 degrees, each opening slot is configured to accept a linear member and each securing end is configured to secure said linear member;

wherein each securing end has a narrowing width and at least a portion of the securing end is smaller than the linear member such that a compression force is applied on the linear member, when the linear member is located in the portion.

17. A linear member holder comprising:

a body comprising a substantially circular cross-section and a longitudinal center axis;

at least two opening slots running along the length of the body and extending a predetermined distance from an exterior of the body toward the longitudinal center axis; each opening slot communicates with a securing end that runs along the length of the body section; and a corner angle is formed at an intersection of each of the opening slots and the respective securing ends, the corner angle is greater than 0 degrees, each opening slot is configured to accept a linear member and each securing end is configured to secure said linear member and at least a portion of each securing end is smaller than the linear member such that a compression force is applied on the linear member, when the linear member is located in the portion.

\* \* \* \* \*